United States Patent [19]

Hardouin

[11] 4,157,137
[45] Jun. 5, 1979

[54] APPARATUS FOR COLLECTING EXTRUDED LENGTHS OF MATERIAL INTO GROUPS

[75] Inventor: Jean P. Hardouin, Luisant, France

[73] Assignee: Alcan Research and Development Limited, Montreal, Canada

[21] Appl. No.: 854,382

[22] Filed: Nov. 23, 1977

[30] Foreign Application Priority Data

Nov. 23, 1976 [GB] United Kingdom ............... 48864/76

[51] Int. Cl.² ............................................ B65G 47/26
[52] U.S. Cl. .................................. 198/418; 198/419; 198/425; 198/430
[58] Field of Search ............... 198/418, 425, 430, 431, 198/474, 485, 487, 631, 746, 747, 748, 419; 214/1 BB, 1 P, 1 PB

[56] References Cited

U.S. PATENT DOCUMENTS

| 3,583,554 | 6/1971 | Hartzell | 198/746 |
| 3,700,090 | 10/1972 | Pearson | 198/474 |
| 3,880,273 | 4/1975 | Kaplan | 214/1 PB |
| 4,029,198 | 6/1977 | Lingl | 198/425 |

FOREIGN PATENT DOCUMENTS

| 629072 | 12/1961 | Italy | 214/1 P |
| 318829 | 12/1969 | Sweden | 198/418 |

Primary Examiner—Joseph E. Valenza
Attorney, Agent, or Firm—Cooper, Dunham, Clark, Griffin & Moran

[57] ABSTRACT

Lengths of material are collected in side-by-side relation in a group and delivered as a group to a receiving station by an apparatus which includes a support table constituted by a number of spaced parallel arms pivoted coaxially with each other about one end. Each arm has a finger which projects upward above the arm and which can be moved toward the pivot for moving the lengths laterally of themselves towards a stop adjacent the pivoted ends of the arms, and during this movement the arms are inclined downward towards their pivot at such an angle that the fingers need exert only a small force to move the lengths towards the stop. A mechanism is provided for moving lengths of material individually or collectively on to the support table for movement by the fingers towards the stop, and a device spaced from the pivots emits a signal when the combined width of the lengths of material which have been moved towards the stop by the fingers reaches a predetermined value, and this signal initiates operation of a mechanism for moving the group of lengths having the predetermined width past the stop to the receiving station.

7 Claims, 7 Drawing Figures

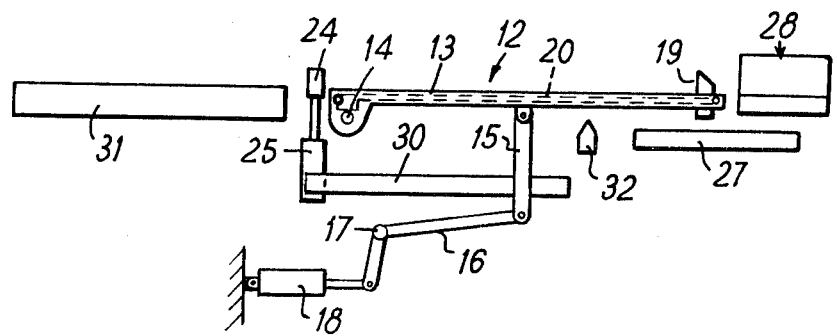
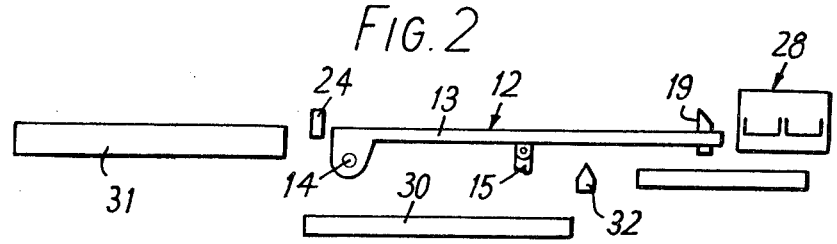
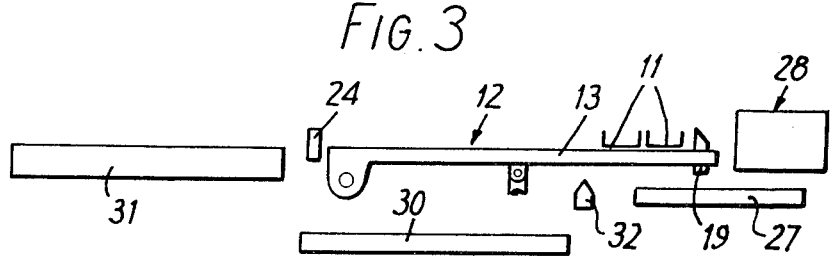
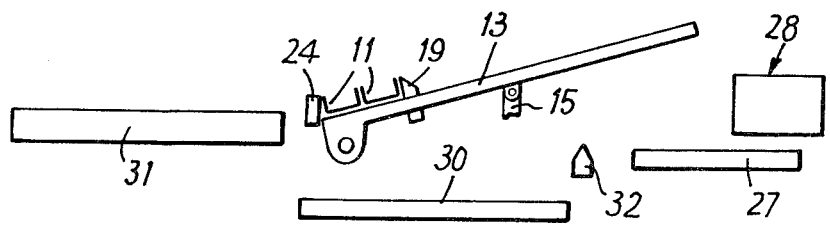

APPARATUS FOR COLLECTING EXTRUDED LENGTHS OF MATERIAL INTO GROUPS

This invention relates to the collection of extruded lengths of material such as aluminium into groups and has a particularly useful but not exclusive application in grouping extruded lengths of aluminium side by side ready for transfer to a stillage where the lengths will form a complete layer in the stillage.

According to this invention there is provided apparatus for collecting lengths of material in side by side relation into a group and delivering the group to a receiving station, comprising a support table which is tiltable by one edge about a horizontal axis between a horizontal position and a position inclined downwardly towards said one edge, fingers mounted on the support table and movable towards and away from said axis for moving lengths of material on the support table towards a stop adjacent said one edge, means for emitting a signal when the lengths of material disposed side by side on the support table have a predetermined total width, means for moving lengths of material laterally of themselves on to the table in a direction towards the stop, and means initiated by the signal for removing the group of lengths of material in their side-by-side formation from the table past the stop to the receiving station.

The table may conveniently comprise a plurality of parallel spaced arms extending at right angles to said axis. The arms are preferably coated with a low-friction material on their surfaces which are to contact said lengths.

One embodiment of the invention will now be described by way of example with reference to the accompanying diagrammatic drawings in which:

FIG. 1 is a aide view of the apparatus with its operating means, and

FIGS. 2 to 7 show the apparatus in six successive stages of its cycle of operations, the actuators and motors being omitted for clarity.

Figure 5:
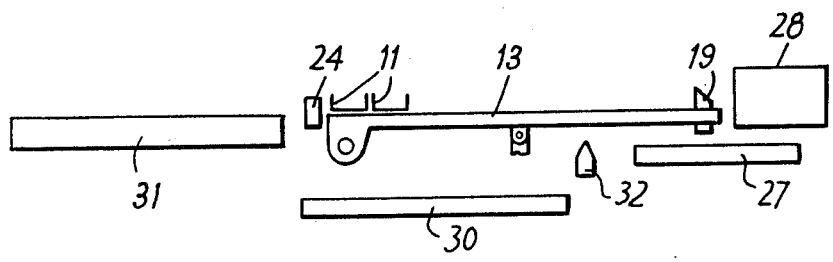
Figure 6:
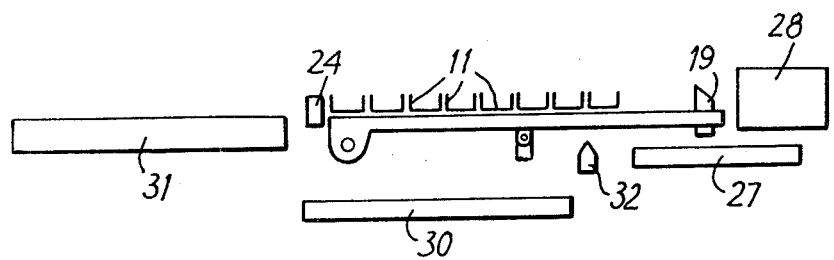
Figure 7:
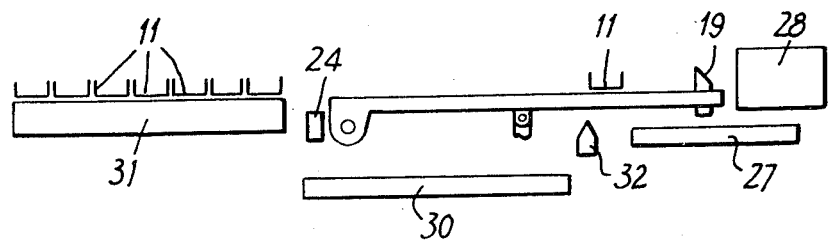

The drawings illustrate the application of the invention to an apparatus which received extruded lengths of aluminium from a stretching apparatus, collecting the lengths in side by side formation in groups. Each group has a predetermined total width equal to the width of a stillage which is to receive the group so that the group will form a complete layer in the stillage. The apparatus passes the group of lengths in their side by side formation to a saw table for sawing to a common length prior to loading into the stillage.

The apparatus comprises a support table 12 which is composed of a series of spaced parallel arms 13 mounted by one end on individual coaxially-arranged horizontal pivot shafts 14 and coupled together for pivotal movement by links 15 connected between the arms and respective cranks 16 secured on a shaft 17, pivotal movement of which is actuated by a piston-and-cylinder motor 18. Two or more of the arms 13 have near their other ends fingers 19 which are secured to respective carriages which are moved along the arms by cables 20 driven by respective reversible motors which may conveniently be small air motors, so that the fingers 19 can be traversed in each direction along the arms 13. Each finger is pivotally connected to its carriage about a horizontal axis and is counterweighted so as to take up an upright position. The counterweight abuts a stop when the finger comes against a force tending to rotate the finger in a clockwise direction from the upright position as viewed in the drawing, but allows the finger to fold down below the level of the upper surface of the support table 12 when the finger is rotated in an anticlockwise direction. A stop bar 24 extending along the pivoted ends of the arms is movable by a suitable actuator 25 into an operative position above the level of the support table and into an inoperative retracted position below the top surface of the support table. A first walking beam mechanism 27 is provided for moving the extruded lengths laterally over fingers 19 and on to the support table 12 from the support surface of the stretching apparatus 28. The fingers are folded down by the passing of the lengths, but are afterwards returned to their upright positions by the counterweights. A second walking beam mechanism 30 is provided for moving each group of extruded lengths from the support table 12 to the saw table 31.

The stretched extruded lengths 11 are shown as being of channel section, see FIG. 2. From the stretching apparatus 28 the lengths 11 are moved laterally (FIG. 3), by the walking beam mechanism 27 or other suitable device on to the arms 13.

The stretched extrusions, which are disposed in twos in this instance, when moved on to the arms by the walking beam mechanism, trigger operation of a device (not shown) which actuates motor 18 to tilt the table 12 about shafts 14 as shown in FIG. 4 to an angle just less than the limiting angle of friction, about 12° to the horizontal. The top surfaces of the arms 13 are coated with a low-friction material such as molybdenum disulphide filled nylon. Fingers 19 are then operated, by their respective motor-driven cables 20, to move along the arms to push the extruded lengths into engagement with the stop 24. Only a very light pressure is required for this purpose because of the tilt angle, and the fingers in consequence do not mark the extruded lengths. Also the low-friction covering of the arms reduces the risk of marks on the lengths. The low finger pressure also avoids the risk of the extruded lengths riding one over the other. The use of air motors to drive the cables 20 is advantageous in that the motors can slip when the lengths come into abutment with the stop.

When the extruded lengths are pushed against the stop 24, fingers 19 are returned to their initial position adjacent the free ends of the arms, and lowering of the table into its horizontal position by motor 18 is simultaneously initiated automatically (FIG. 5). A sensor 32 in the form of a proximity switch or photocell is disposed below the table 12 and is now energised to detect whether there is a full load on the table. Initially there will be insufficient extruded lengths on the table to cause the sensor to give a signal indicating a full load. As the extruded lengths accumulate, however, the time comes with the load extends beyond the sensor, and the sensor then emits a signal which initiates actuator 25 to retract the end stop 24 below the level of table 12 and actuation of the walking beam mechanism 30 to move the lengths laterally on to the saw table 31. The end of the walking beam is in line with the sensor 32 so that any lengths extending beyond the sensor are not lifted by the walking beam 30 but remain on the table for inclusion in the next load.

A manual over-ride is provided to enable the last few extruded lengths of a production run to be cleared even though insufficient to provide a full layer in the stillage.

A protective switch system is incorporated to ensure that the saw-table is clear before the next group of extruded lengths is transferred. In the event of a hold-up at the saw, the extrusion and hence the subsequent stretching operations are delayed until the saw table is cleared to accept the next load.

I claim:

1. Apparatus for collecting lengths of material in side by side relation into a group and delivering the group to a receiving station, comprising a support table which is tiltable by one edge about a horizontal axis between a horizontal position and a position inclined downwardly towards said one edge, a stop adjacent said one edge of the support table, means for tilting said table, fingers mounted on the support table and movable towards and away from said axis for moving lengths of material on the support table towards said stop, means for moving said fingers toward and away from said stop whereby said fingers move the lengths of material when said table is in the inclined position, means for emitting a signal when the lengths of material disposed side by side on the support table have a predetermined total width, means for moving lengths of material laterally of themselves on to the table in a direction towards the stop, and means initiated by the signal for removing the group of lengths of material in their side-by-side formation from the table past the stop to the receiving station.

2. Apparatus as claimed in claim 1, further comprising means for moving the stop between its operative position and a retracted position and wherein emission of said signal initiates operation of said means to retract the stop.

3. Apparatus as claimed in claim 1 wherein the means for moving the lengths of material on to the table comprises a walking beam means.

4. Apparatus as claimed in claim 1, wherein the means for removing the group of lengths from the table comprises a walking beam means.

5. Apparatus as claimed in claim 4, wherein the walking beam means is arranged to remove the whole group of lengths together and has a length and locus of movement such as to leave on the table any additional length or lengths.

6. Apparatus as claimed in claim 1, wherein the support table is constituted by a plurality of spaced parallel arms.

7. Apparatus as claimed in claim 6, wherein the upper surfaces of the arms are coated with a solid low-friction material.

* * * * *